(12) United States Patent
Rothleitner et al.

(10) Patent No.: US 6,731,023 B2
(45) Date of Patent: May 4, 2004

(54) BACKUP POWER SUPPLY FOR RESTRAINT CONTROL MODULE

(75) Inventors: Hubert Rothleitner, Villach (AT); Michael Breunig, Villach (AT); Colm Peter Boran, Novi, MI (US); David James Tippy, Farmington Hills, MI (US); Myron Ihor Senyk, Rochester Hills, MI (US); Vincent Colarossi, Dearborn Heights, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/821,573

(22) Filed: Mar. 29, 2001

(65) Prior Publication Data

US 2002/0140293 A1 Oct. 3, 2002

(51) Int. Cl.$^7$ ................................. H02J 7/00
(52) U.S. Cl. ..................... 307/64; 307/86; 280/728.1
(58) Field of Search ..................... 280/728.1; 701/45

(56) References Cited

U.S. PATENT DOCUMENTS

| | | | |
|---|---|---|---|
| 3,753,001 A | | 8/1973 | Hiroshima et al. |
| 4,811,190 A | * | 3/1989 | Keir et al. ................ 307/110 |
| 5,045,835 A | * | 9/1991 | Masegi et al. ............ 280/734 |
| 5,187,382 A | * | 2/1993 | Kondo .................... 280/735 |
| 5,365,114 A | | 11/1994 | Tsurushima et al. |
| 5,420,790 A | * | 5/1995 | Ravas et al. ............. 180/282 |
| 5,639,676 A | * | 6/1997 | Hshieh et al. ........... 219/210 |
| 5,703,412 A | | 12/1997 | Takemoto et al. |
| 5,726,944 A | * | 3/1998 | Pelley et al. .......... 365/189.01 |
| 5,737,208 A | * | 4/1998 | Chen ...................... 363/133 |

FOREIGN PATENT DOCUMENTS

JP          11-252825          *    9/1999

OTHER PUBLICATIONS

Patent Abstracts of Japan, Onboard Power Supply System, Pub. No. 11–252825, Pub. date: Sep. 17, 1999.*

* cited by examiner

Primary Examiner—Gregory J. Toatley, Jr.
Assistant Examiner—Sharon A. Polk
(74) Attorney, Agent, or Firm—Brinks Hofer Gilson & Lione; Sally J. Brown; James D. Erickson

(57) ABSTRACT

A backup power supply for a restraint control module is disclosed that includes a main power source that is connected to a backup power source charging circuit. A boost converter control and driver circuit is connected with the main power source and the backup power source such that the boost converter control and driver circuit controls the charging of the backup power source with the main power source during normal operation. A backup power supply control and driver circuit is connected with a backup power supply switching device. The backup power supply control and driver circuit switches the source of power from the main power source to the backup power source when the backup power supply control circuit senses a loss of power from the main power source.

31 Claims, 3 Drawing Sheets

BACKUP POWER SUPPLY FOR RESTRAINT CONTROL MODULE

FIELD OF THE INVENTION

The present invention relates generally to air bag systems for use as safety devices in automotive vehicles and, more particularly, to a backup power supply system for a restraint control module.

BACKGROUND OF THE INVENTION

Over the past several years, there has been a trend in the automotive industry to install air bag systems in vehicles to enhance protection traditionally afforded vehicle occupants through the use of seat belts. In some automotive vehicles, the inflatable restraint system may be an air bag system disposed within an occupant compartment in the automotive vehicle in close proximity to either a driver occupant or one or more passenger occupants. Usually, the air bag system includes a restraint control module that is connected to the vehicle structure and an air bag for deployment through an opening in a cover to extend and inflate in an occupant compartment of the automotive vehicle. The deployed air bag restrains movement of the occupant to protect the occupant from forcefully hitting parts of the automotive vehicle as a result of an automobile accident.

Air bag systems typically include a restraint control module, a reaction canister and an air bag and inflator that are stored inside the reaction canister. Generally speaking, the inflator is actuated by a signal received from a vehicle deceleration sensor or accelerometer that is connected to the restraint control module, which, in turn, causes a discharge of inflator gas into the interior of the air bag. The restraint control module controls the overall operation of the air bag system and essentially could be viewed as the main control unit for the air bag system.

As with any system based on electronic components and sensors, air bag systems and their associated electronic components, require power from a power supply in order to function properly. During normal operation, the power used to drive an air bag system and its related components originates from a battery that is located in the automotive vehicle. During some automotive accidents, the electrical conductors that connect the battery to the air bag system and its related electronic components may become severed or damages so that power is cut off to these systems. As a result of the conductor being severed or damaged, the electronic components of the air bag system lose power and will not function properly due to the loss of power. As such, a need exists in the automotive industry for methods and systems of providing backup power to the air bag system.

SUMMARY OF THE PRESENT INVENTION

The present invention discloses a backup power supply system for a restraint control module. The preferred backup power supply system includes a main power source that is connected to a backup power source charging circuit as well as the restraint control module. During normal operation, the main power source provides power to the restraint control module. A backup power source is connected to the backup power source charging circuit and the restraint control module. A boost converter control and driver circuit is connected to a boost converter switching device, which is, in turn, connected to the backup power source charging circuit. During normal operation, the boost converter control and driver circuit switches the boost converter switching device to charge the backup power source with the main power source using the backup power source charging circuit.

A backup power supply control and driver circuit is connected to a backup power supply switching device as well as the boost converter control and driver circuit. The backup power supply control and driver circuit uses the backup power supply switching device to switch the source of power to the restraint control module from the main power source to the backup power source if a loss of power is sensed from the main power source. The backup power supply control and driver circuit is connected to the boost converter control and driver circuit to ensure that the booster converter control and driver circuit does not attempt to charge the backup power source while it is providing power to the restraint control module in the event of a power loss.

In the preferred embodiment, the backup power supply charging circuit comprises an inductor that is electrically connected to the main power source and the backup power source. During normal operation, the inductor is pulse width modulated using the boost converter switching device to charge the backup power source. The backup power source comprises a capacitor that is preferentially sized to charge to a predetermined voltage within six seconds of startup of the vehicle.

The preferred backup power supply system may also include a voltage regulator that is connected to the output of the backup power source and the boost converter control and driver circuit. The voltage regulator is used to regulate the output voltage generated by the backup power source while the backup power source charging circuit is charging the backup power source. The preferred voltage regulator comprises an error amplifier connected to a pulse width modulator comparator.

The backup power supply system may also include a charge pump circuit that is connected to the output of the backup power source. The charge pump circuit includes a charge pump that is used in the preferred embodiment to generate a plurality of gate drive voltages that are higher than the voltage present on the backup power source. The gate drive voltages may then be used to drive internal and external high side switches effectively.

An over-current protection circuit is also included in the preferred backup power supply system and is connected to the boost converter switching device and the boost converter control and driver circuit. The over-current protection circuit causes the boost converter control and driver circuit to stop switching the boost converter switching device to charge the backup power source if a predetermined current threshold is exceeded.

Further objects and advantages of the present invention will be apparent from the following description, reference being made to the accompanying drawings wherein preferred embodiments of the present invention are clearly shown.

DETAILED DESCRIPTION OF THE DRAWINGS

DETAILED DESCRIPTION OF THE PRESENTLY PREFERRED EMBODIMENTS OF THE INVENTION

Figure 1:
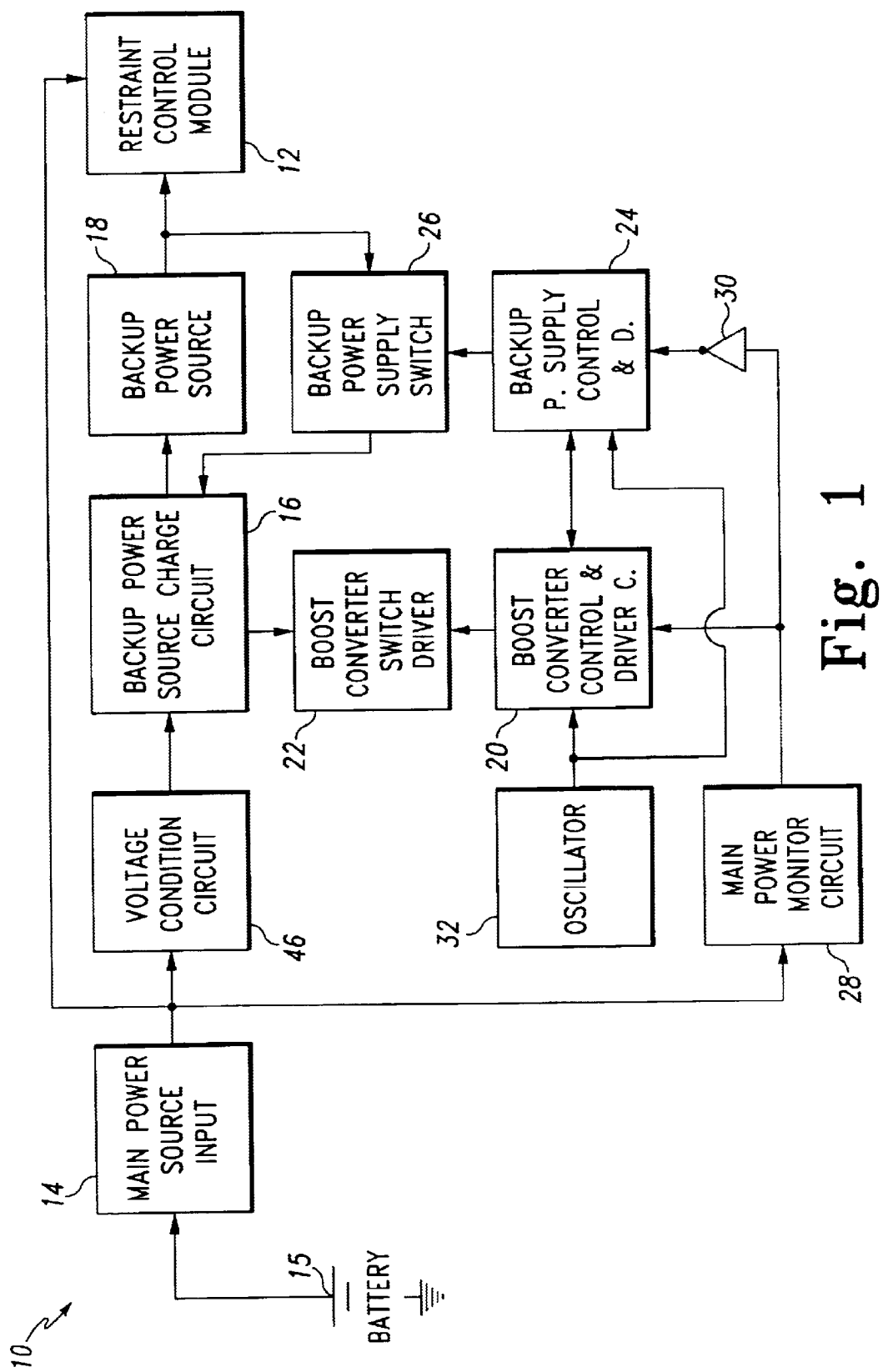
FIG. 1 illustrates a preferred backup power supply system for a restraint control module.

Referring to FIG. 1, a preferred embodiment of a backup power supply system 10 for a restraint control module 12 is illustrated. The backup power supply system 10 includes a main power source 14 that is connected to a backup power source charging circuit 16 and the restraint control module 12. During normal operation, the backup power source charging circuit 16 is used to initially charge and maintain a predetermined level of charge on a backup power source 18 that is connected to the output of the backup power source charging circuit 16. The output of the backup power source 18 is connected to the restraint control module 12 so that the backup power source 18 can provide power to the restraint control module 12 in the event of a loss of power from the main power source 14. The main power source 14 is also connected to the restraint control module 12 and provides power to the restraint control module 12 unless disconnected or taken out during an event experienced by the vehicle.

The charging of the backup power source 18 is controlled by a boost converter control and driver circuit 20 that is connected to a boost converter switching device 22. The boost converter switching device 22 is also connected to the backup power source charging circuit 16. In the preferred embodiment, the boost converter control and driver circuit 20 is used to drive the boost converter switching device 22, which, in turn, causes the backup power source charging circuit 16 to charge and maintain a charge on the backup power source 18.

During normal operation, the boost converter control and driver circuit 20 controls the charging of the backup power source 18 to a predetermined voltage by switching the boost converter switching device 22 on and off at a predetermined time interval or duty cycle, thereby causing the backup power source charging circuit 16 to charge the backup power source 18. As such, when the boost converter switching device 22 is energized by an output pulse from the boost converter control and driver circuit 20 during normal operation, the boost converter switching device 22 causes the backup power source charging circuit 16 to deliver energy to and thus charge the backup power source 18.

As further illustrated in FIG. 1, in the preferred embodiment of the backup power supply system 10, a backup power supply control and driver circuit 24 is connected to a backup power supply switching device 26. The backup power supply switching device 26 is used to switch the source of power for the restraint control module 12 from the main power source 14 to the backup power source 18 in the event of a loss of power. The backup power supply switching device 26 is also connected to the boost converter switching device 22 and the backup power source charging circuit 16. When a loss of power is experienced from the main power source 14, the boost converter control and driver circuit 20 stops energizing the boost converter switching device 22 and the backup power supply switching device 26 simultaneously transfers power to the restraint control module 12 from the main power source 14 to the backup power source 18.

In the preferred embodiment of the present invention, a main power monitoring circuit 28 is connected with the main power source 14, which continuously monitors the magnitude of voltage available on the main power source 14. The output of the main power monitoring circuit 28 is connected to the boost converter control and driver circuit 20 and the backup power supply control and driver circuit 24 through an inverter 30. During normal power operation, the output of the main power monitoring circuit 28 causes the boost converter control and driver circuit 20 to operate in a charging mode, thereby initially charging and maintaining a charge on the backup power source 18. If a power loss is experienced from the main power source 14, the main power monitoring circuit 28 stops the boost converter control and driver circuit 20 from charging the backup power source 18 and causes the backup power supply control and driver circuit 24 to transfer power from the main power source 14 to the backup power source 18.

As further illustrated in FIG. 1, an oscillator 32 is also connected with the boost converter control and driver circuit 20 and the backup power supply control and driver circuit 24 for driving each respective circuit. During normal operation, the duty cycle of a rising saw tooth ramp that is generated by the oscillator 32 controls the duty cycle of the signal that is used to control the boost converter switching device 22. As previously set forth, the boost converter switching device 22 is used to control the backup power source charging circuit 16, which charges the backup power source 18. Those skilled in the art would recognize that several other control inputs may be connected with the boost converter control and driver circuit 20 and the backup power supply control and driver circuit 24 to control the overall operation of the boost converter control and driver circuit 20 and the backup power supply control and driver circuit 24.

Figure 2:
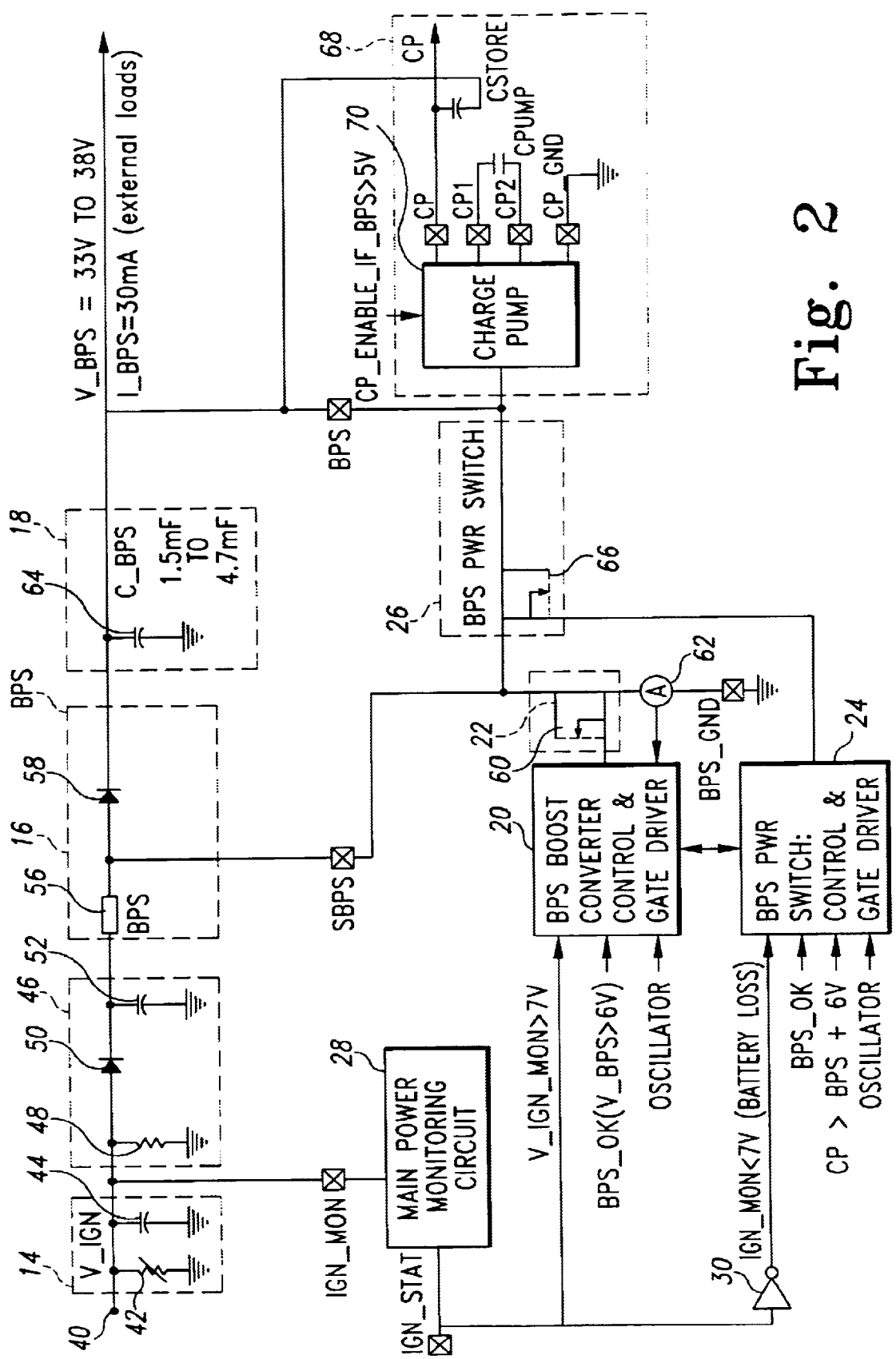
FIG. 2 illustrates a more detailed circuit schematic of the backup power supply system illustrated in FIG. 1.

Referring to FIG. 2, a more detailed circuit diagram of the preferred backup power supply system 10 illustrated in FIG. 1 is set forth. In this embodiment, the main power source 14 is provided from the voltage present on an ignition terminal 40, which is commonly found in automobile electronic circuitry and powered from a battery 15 (see FIG. 1). As further illustrated, a metal oxide varistor (MOV) 42 and a first capacitor 44 are connected with the ignition terminal 40 of the main power source 14 to form a first voltage conditioning circuit. Generally speaking, when the automobile is running, there will be a predetermined voltage level present on the ignition terminal 40, which is conditioned by the first voltage conditioning circuit to generate a predetermined output voltage. In the preferred embodiment, the predetermined output voltage generated by the main power source 14 is adjustable to 33 V or 38 V for the backup power supply system 10, depending on the particular requirements needed by the restraint control module 12 to operate properly and the amount of voltage present on the ignition terminal 40.

Illustrated in FIG. 1, in the preferred embodiment, a second voltage conditioning circuit 46 is connected to the output of the main power source 14 as illustrated in FIG. 2. The second voltage conditioning circuit 46 includes a pull-down resistor 48, a first Schotkey diode 50 and a second capacitor 52. As illustrated, the pull-down resistor 48 is connected to the first Schotkey diode 50, which is, in turn, connected to the second capacitor 52. The pull-down resistor 48 is used to ensure that the voltage on the ignition input is brought down quickly in the event of a power interruption, the first Schotkey diode 50 is used to block negative input voltage and the capacitor is used to filter any unwanted high frequency noise that may be present on the main power source 14 and as a bulk energy storage device for the switching regulators. The preferred value of the second capacitor 52 is 220 uF.

As further illustrated in FIG. 2, the preferred backup power source charging circuit 16 comprises an inductor 56 and a second Schotkey diode 58. The inductor 56 is connected to the output of the second voltage conditioning circuit 46 and the second Schotkey diode 58. The second Schotkey diode 58 is also connected to the backup power source 18. The boost converter switching device 22 is connected to the backup power source charging circuit 16 between the inductor 56 and the second Schotkey diode 58 as illustrated in FIG. 2. As such, during charging operations the boost converter switching device 22 causes the inductor 56 to deliver current to the backup power source 18.

As illustrated in FIG. 2, the preferred boost converter switching device 22 comprises a first DMOS transistor 60. The gate of the first DMOS transistor 60 is connected to the output of the boost converter control and driver circuit 20 and the source of the first DMOS transistor 60 is connected to the backup power source charging circuit 16. The drain of the first DMOS transistor 60 is connected to a current sensor circuit 62, which is in turn connected to the boost converter control and driver circuit 20. During normal operation, in which the voltage from the main power source 14 is sensed as being within a nominal ignition-voltage range, the inductor 56 is switched using pulse width modulation by the first DMOS transistor 60 to thereby charge the backup power source 18, which, in the preferred embodiment, comprises a second capacitor 64 that preferentially does not exceed 4700 uF.

The preferred backup power supply system 10 works by shorting the inductor 56 across the voltage supplied by the main power source 14. This stores energy in the inductor 56. When the first DMOS transistor 60 is turned off, the inductor 56 is placed in series with the voltage supplied by the main power source 14. As a result, the resulting voltage pulse generated by the inductor 56 is directed to the backup power source 18, which, as set forth above, comprises a capacitor 64. The second Schotkey diode 58 is used to keep the backup power source 18 from discharging during switching.

The second capacitor 64 is preferentially adequately sized to maintain power in the restraint control module 12 and other devices during a 150 ms battery drop out event. In the preferred embodiment, the boost converter control and driver circuit 20 is capable of charging the backup power source 18 to the maximum output voltage, which is 33 V or 38 V, within six seconds of power-up over the entire input-voltage range. The boost converter control and driver circuit 20 is connected to the backup power supply control and driver circuit 24 so that each respective circuit is not operating at the same time. As such, when the boost converter control and driver circuit 20 is charging the backup power source 18, the backup power supply control and driver circuit 24 is not energizing the backup power supply switching device 26.

As further illustrated in FIG. 2, the backup power supply switching device 26 comprises a second DMOS transistor 66. The gate of the second DMOS transistor 66 is connected to the output of the backup power supply control and driver circuit 24. The drain of the second DMOS transistor 66 is connected to the output of the backup power supply 18 and the source is connected to the drain of the first DMOS transistor 60. As such, when the backup power supply control and driver circuit 24 senses a loss in power from the main power source 14, the second DMOS transistor 66 is energized by the backup power supply control and driver circuit 24 to transfer power from the backup power source 18 to the second voltage conditioning circuit 46. Likewise, during this loss of power, the boost converter control and driver circuit 20 is not driving the boost converter switching device 22 and therefore the backup power source charging circuit 16 no longer charges the backup power source 18.

A charge pump circuit 68 may also be connected to the output of the backup power source 18. The charge pump circuit 68 includes a charge pump 70 that is used in the preferred embodiment to generate a plurality of gate drive voltages that are higher than the voltage present on the backup power source 18. The gate drive voltages can be used to drive internal and external high side switches effectively. Those skilled in the art would recognize that several different internal and external high side switches may be connected with the charge pump circuit 68.

Figure 3:
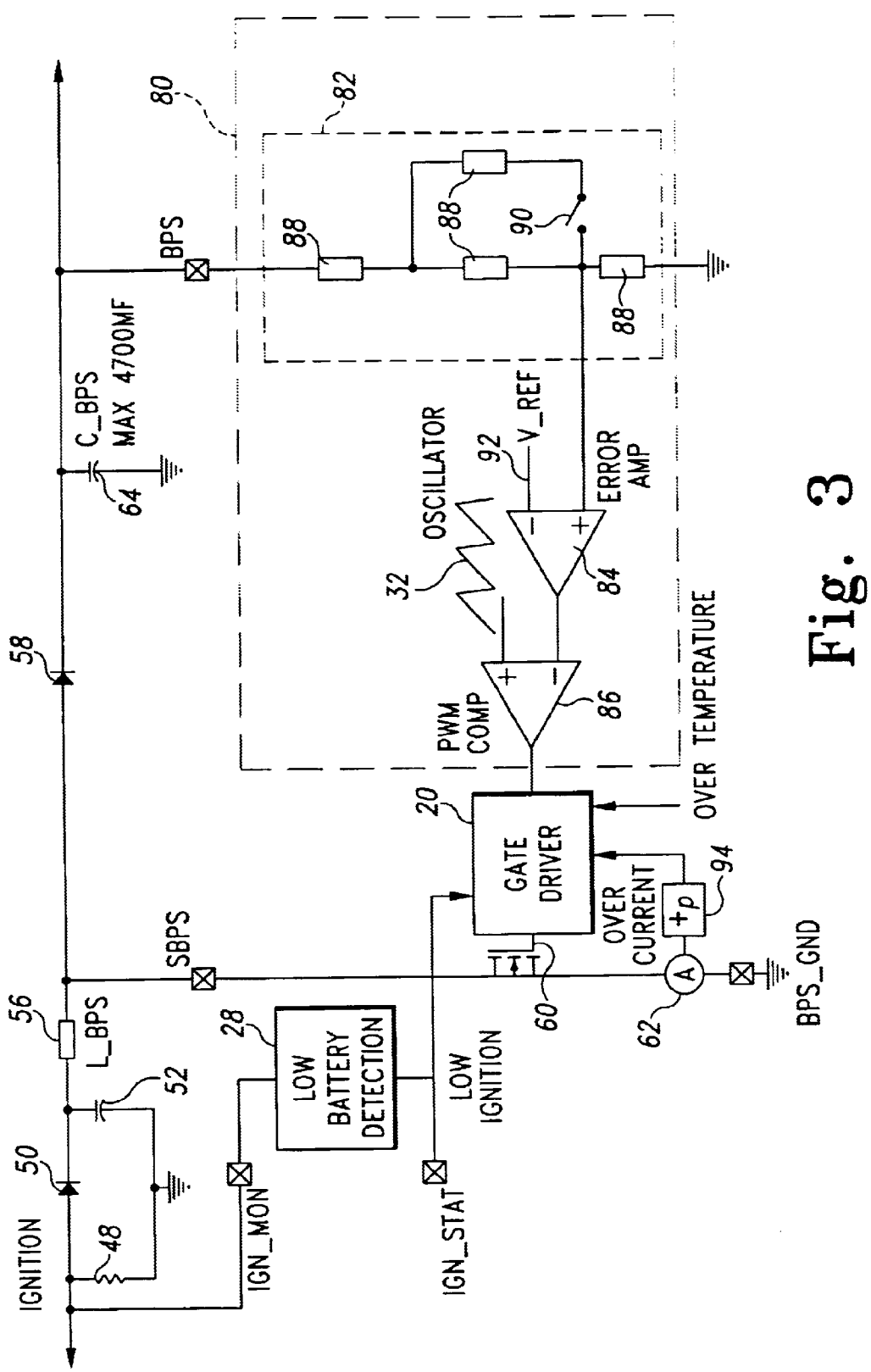
FIG. 3 illustrates a detailed circuit schematic of the voltage regulator circuit of the preferred backup power supply system.

Referring to FIG. 3, in the preferred embodiment, the voltage generated by the backup power source 18 may be regulated by a voltage regulator circuit 80. The voltage regulator circuit 80 comprises a resistor divider chain 82, an error amplifier 84 and a pulse width modulation comparator 86. The resistor divider chain 82 includes a plurality of resistors 88 that are connected to form a voltage divider, the output of which is connected to the input of the error amplifier 84. The resistor divider chain 82 also includes a serial port interface switch 90 that allows the resistor divider chain 82 to be programmed for 33 V or 38 V operation, depending on the operating requirements of the vehicle. The output of the backup power source 18 is connected to the resistor divider chain 82 of the voltage regulator circuit 80 to generate the output provided to the error amplifier 84.

The error amplifier 84 compares a reference voltage 92 with the voltage from the backup power source 18, which, as previously set forth, has been scaled down from the resistor divider chain 82. Using the pulse width modulation comparator 86, the output of the error amplifier 84 is compared with a periodic linear ramp that is provided by the saw tooth signal that is generated by the oscillator 32. As a result, the pulse width modulation comparator 86 generates a logic signal with variable pulse width, which is then passed to the boost converter control and driver circuit 20. The maximum duty cycle is determined by the duration of the rising ramp of the oscillator 32. The first DMOS transistor 60 operates at the tuned frequency of the oscillator 32 and also features a maximum duty cycle limitation.

Although not illustrated, slope control can be implemented in the boost converter control and driver circuit 20 to minimize EMI emissions and interference with the second Schotkey diode 58 recovery time. Further, although also not illustrated, those skilled in the art would recognize that the turn on and off times of the DMOS transistors 60, 66 can be adjusted by an external variable resistor. As set forth above, the compensation network of the voltage regulator circuit 80 is fully integrated and there is no need for an external compensation network.

Over-current shutdown may also be provided to the backup power supply system 10 on a cycle-by-cycle basis by the current sensor 62, which, as previously set forth, is connected to the boost converter control and driver circuit 20 and the boost converter switching device 22. Although not illustrated, in the preferred embodiment, the current sensor also includes an over-current delay filter. Once the over-current threshold is exceeded and propagates through the over-current delay filter, the boost converter control and driver circuit 20 is shut down. An over-current delay prevents immediate over-current shutdown due to high inrush currents from external parasitic capacitors. Once the boost converter control and driver circuit 20 is shut down due to over-current, it will remain off until the next on cycle of the boost converter control and driver circuit 20.

Over-temperature protection is provided to the backup power supply system 10 by a temperature sensor 94 that is connected to the first DMOS transistor 60 and the boost converter control and driver circuit 20. During operation, the temperature sensor 94 senses the temperature of the first DMOS transistor 60. When the temperature exceeds a programmed threshold level, the temperature sensor 94 causes the boost converter control and driver circuit 20 to shut down, thereby disabling the first DMOS transistor 60 from charging the backup power source 18. The first DMOS transistor 60 will be enabled immediately when the temperature of the first DMOS transistor 60 drops below the programmed threshold by a hysterysis value.

Although not illustrated, an external R-C network may be connected between the drain and source of the first DMOS transistor 60. The R-C network is designed to provide two functions in the backup power supply system 10. First, it can prevent transient over-voltages on the first DMOS transistor 60 as the device turns on and off with a slow external boost diode 58. Second, it provides for reduced levels of below-ground transients, hence reducing substrate injection effects in a fully integrated circuit in junction technology.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A backup power supply system for a restraint control module, comprising:
   a main power source connected to a backup power source charging circuit and said restraint control module;
   a backup power source connected to said backup power source charging circuit and said restraint control module;
   a boost converter control and driver circuit connected to a boost converter switching device that is connected to said backup power source charging circuit, wherein said boost converter control and driver circuit turns said boost converter switching device on and off at a predetermined duty cycle to charge said backup power source with said backup power source charging circuit during normal power operation; and
   a backup power supply control and driver circuit connected to a backup power supply switching device that is connected to said backup power source, wherein said backup power supply control and driver circuit uses said backup power supply switching device to switch the source of power to said restraint control module from said main power source to said backup power source during a loss of power from said main power source.

2. The backup power supply system of claim 1, further comprising a main power source monitoring circuit connected to said boost converter driver and control circuit and said backup power supply control and driver circuit for monitoring power on said main power source.

3. The backup power supply system of claim 1, wherein said backup power source charging circuit comprises an inductor connected to said main power source and said backup power source.

4. The backup power supply system of claim 1, wherein said backup power source comprises a capacitor.

5. The backup power supply system of claim 1, wherein said boost converter switching device comprises a first DMOS transistor.

6. The backup power supply system of claim 1, wherein said backup power supply switching device comprises a second DMOS transistor.

7. The backup power supply system of claim 1, further comprising a voltage regulator connected to said backup power source and said boost converter control and driver circuit for regulating the output voltage generated by said backup power source.

8. The backup power supply system of claim 7, wherein said voltage regulator comprises an error amplifier connected to a pulse width modulator comparator.

9. The backup power supply system of claim 1, further comprising a charge pump circuit connected to the output of said backup power source for powering at least one actual device.

10. The backup power supply system of claim 1, further comprising an over-current protection circuit connected to said boost converter switching device and said boost converter control and driver circuit, wherein said over-current protection circuit causes said boost converter control and driver circuit to stop switching said boost converter switching device to charge said backup power source if a predetermined current threshold is exceeded.

11. The backup power supply system of claim 1, further comprising an oscillator connected to said boost converter control and driver circuit and said backup power supply control and driver circuit, wherein said oscillator is used to drive said boost converter control and driver circuit and said backup power supply control and driver circuit.

12. A backup power supply system for a restraint control module, comprising:
    a main power source;
    a backup power source charging circuit connected to said main power source;
    a backup power source connected to said backup power supply charging circuit;
    first means for switching, at a predetermined duty cycle, said backup power supply charging circuit to charge said backup power source during normal power operation; and
    second means for switching the power being supplied to said restraint control module from said main power source to said backup power source in the event said main power source experiences a loss of power.

13. The backup power supply system of claim 12, further comprising a power sensing circuit connected to said main power source, said boost converter control and driver circuit and said backup power supply control and driver circuit.

14. The backup supply system of claim 12, wherein said first means comprises a boost converter control and driver circuit connected to a boost converter switching device, wherein said boost converter control and driver circuit turns said boost converter switching device on and off at a predetermined duty cycle to charge said backup power source with said backup charging circuit during normal power operation.

15. The backup power supply system of claim 14, wherein said boost converter switching device comprises first DMOS transistor.

16. The backup power supply system of claim 12, wherein said second means comprises a backup power supply control and driver circuit connected to a backup power supply switching device, wherein said backup power supply control and driver circuit uses said backup power supply switching device to switch the source of power to said restraint control module from said main power source to said backup power source during a loss of power from the main power source.

17. The backup power supply of claim 18, wherein said backup power supply switching device comprises a second DMOS transistor.

18. The backup power supply system of claim 12, wherein said backup power supply charging circuit comprises an inductor electrically connected with said main power source and said backup power source.

19. The backup power supply system of claim 12, wherein said backup power source comprises a capacitor.

20. The backup power supply system of claim 12, further comprising a voltage regulator connected to the output of said backup power source for regulating the output voltage generated by said backup power source.

21. The backup power supply system of claim 20, wherein said voltage regulator comprises an error amplifier connected to a pulse width modulator comparator.

22. The backup power supply system of claim 12, further comprising a charge pump circuit connected to the output of said backup power source.

23. The backup power supply system of claim 12, further comprising an over-current protection circuit connected to said boost converter switching device and said boost converter control and driver circuit, wherein said over-current protection circuit causes said boost converter control and driver circuit to stop switching said boost converter switching device to charge said backup power source if a predetermined current threshold is exceeded.

24. A backup power supply system for a restraint control module, comprising:

powering said restraint control module with a main power source during normal operation;

sensing power on said main power source with main power monitoring circuit;

providing a boost converter control and driver circuit connected to a boost converter switching device;

charging a backup power source with a backup power source charging circuit connected to said main power source and said boost converter switching device, wherein said boost converter control and driver circuit switches said boost converter switching device on and off at a predetermined duty cycle to thereby transfer energy to said backup power source when said main power source is operating within a predetermined nominal voltage range; and switching power to said restraint control module from said main power source to said backup power source with a backup power supply control and driver circuit that is connected to a backup power source switching device, wherein said backup power source switching device is used to transfer power form said main power source to said backup power source.

25. The method of claim 24, further comprising the step of regulating the output voltage generated by said backup power source with a voltage regulator.

26. The method of claim 24, wherein said voltage regulator is connected to said backup power source and said boost converter control and driver circuit.

27. The method of claim 24, wherein said backup power source comprises a capacitor.

28. The method of claim 24, wherein said backup power source charging circuit comprises an inductor.

29. The method of claim 24, wherein said boost converter switching device comprises a first DMOS transistor.

30. The method of claim 24, wherein said backup power supply switching device comprises a second DMOS transistor.

31. The method of claim 24, further comprising the step of providing over-current protection to said boost converter switching device with an over-current protection circuit connected to said boost converter switching device and said boost converter control and driver circuit.

* * * * *

UNITED STATES PATENT AND TRADEMARK OFFICE
CERTIFICATE OF CORRECTION

PATENT NO. : 6,731,023 B2
DATED : May 4, 2004
INVENTOR(S) : Hubert Rothleitner et al.

It is certified that error appears in the above-identified patent and that said Letters Patent is hereby corrected as shown below:

Column 8,
Line 63, delete "claim 18," and substitute -- claim 16, -- in its place.

Column 10,
Line 11, after "transfer power" delete "form" and substitute -- from -- in its place.

Signed and Sealed this

Fourteenth Day of December, 2004

JON W. DUDAS
*Director of the United States Patent and Trademark Office*